March 9, 1954 R. B. STEELE 2,671,869
AUTOMATIC ARC WELDING METHOD AND APPARATUS
Filed July 13, 1950
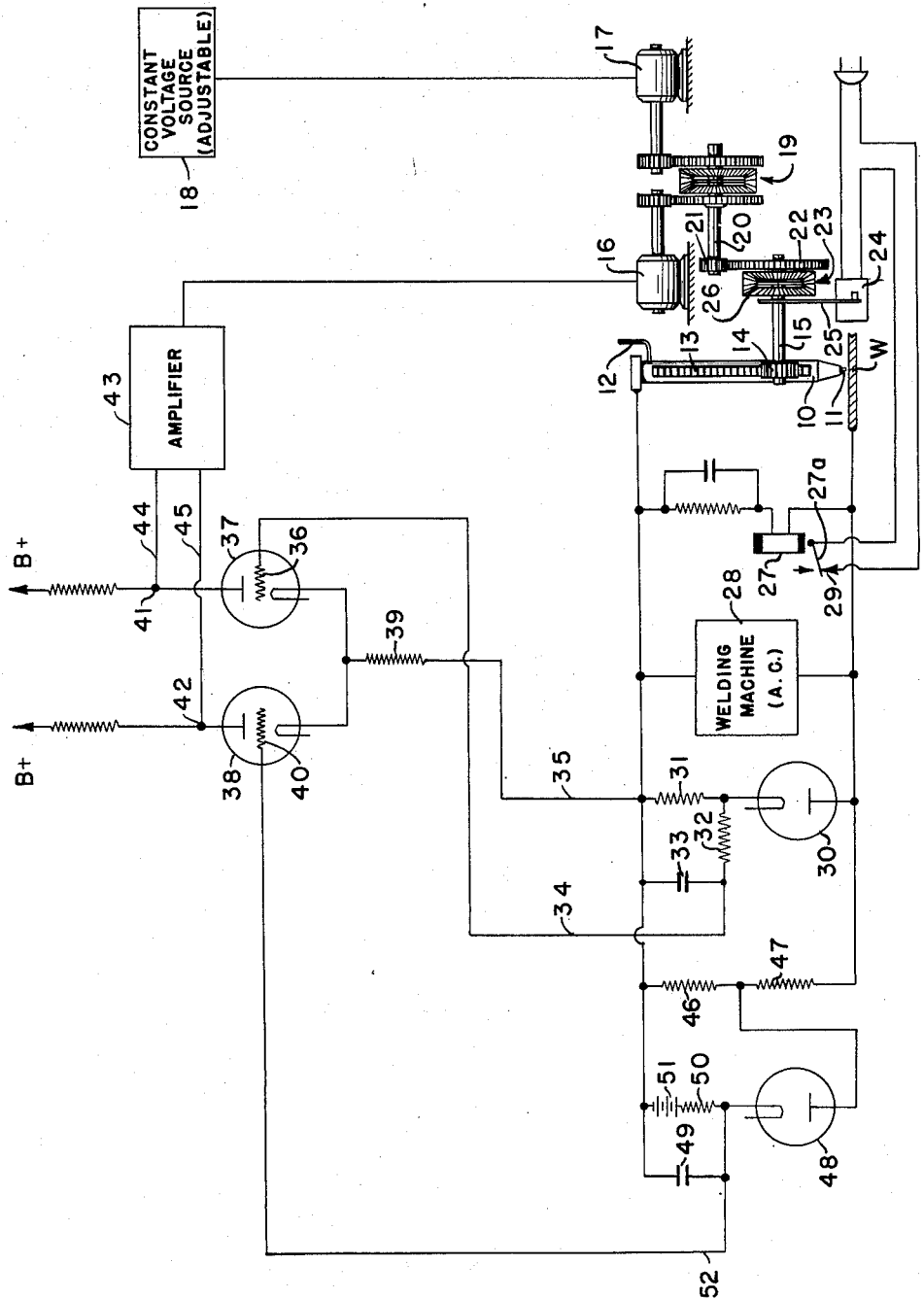
INVENTOR
RICHARD B. STEELE
BY
ATTORNEYS Patented Mar. 9, 1954

2,671,869

UNITED STATES PATENT OFFICE 2,671,869

AUTOMATIC ARC WELDING METHOD AND APPARATUS

Richard B. Steele, New Providence, N. J., assignor to Air Reduction Company, Incorporated, Murray Hill, N. J., a corporation of New York Application July 13, 1950, Serial No. 173,514

9 Claims. (Cl. 314—62)

This invention relates to automatic arc welding and more particularly to an improved method and apparatus for automatically maintaining the desired distance between the tip of the electrode and the work.

In automatic arc welding it is desirable to provide means for automatically adjusting the position of the tip of the electrode with respect to the work so that the arc length is maintained substantially constant regardless of changes of contour of the work and regardless of any temporary tendency of the arc length to change.

The usual way of adjusting the position of the tip of the electrode with respect to the work and thereby maintaining the arc length substantially constant is to employ means for adjusting the position of the electrode, hereinafter called electrode-moving mechanism, that is responsive to variations in the arc voltage. When the arc becomes longer than the desired normal, the arc voltage rises and the electrode-moving mechanism responds by feeding the electrode at a faster rate, (in the case of a consumable electrode that is continuously fed toward the work by the electrode-moving mechanism) or by positioning the whole electrode closer to the work (in the case of a non-consumable electrode). Similarly, when the arc length becomes shorter than the desired normal the electrode-moving mechanism responds by feeding a consumable electrode at a slower rate or by moving a non-consumable electrode farther from the work.

I have discovered that for any given arc length the arc voltage is abnormally high during the interval that the electrode is heating up after the arc is established. In other words, for an arc of given length the arc voltage is considerably greater when the arc is first established and the electrode is relatively cold, than it is during the remainder of the welding operation when the electrode attains its normal welding temperature. During heating up of the electrode the abnormally high arc voltage diminishes progressively to the value that is normal for the given arc length, but this happens very quickly and an abnormally high arc voltage for the given arc length therefore exists only in the first brief instant after the arc is first established. The electrode-moving mechanism that automatically maintains the arc length substantially constant responds to this initial abnormally high arc voltage and therefore keeps the arc shorter than the desired normal length during the time that the electrode is heating up.

Sometimes this action is supplemented by the inertia of the parts of the electrode-moving mechanism which tends to shorten the arc still more immediately after the arc is established. For instance, in a welding system of the kind disclosed in the Patent to N. E. Anderson No. 2,461,798, issued February 15, 1949, a pair of electric motors running in opposite directions adjusts the position of the electrode holder during the welding operation through the intermediary of differential mechanism. The arc is started by lowering the electrode holder from a position above the work until the electrode touches the work and at that instant a solenoid operates on the differential mechanism to superimpose on it a motion that results in retracting the electrode holder away from the work to strike the arc. In such a system there is a tendency for the arc to be too short when first established because the inertia of the mechanism which moves the electrode holder toward the work prevents it from stopping instantly and this supplements the above-described spurious response of the electrode-moving mechanism to the abnormally high arc voltage which exists while the electrode is heating up. As a result of the combination of the arc shortening effect during heating of the electrode, and the arc shortening effect due to the inertia of the lowering mechanism for the electrode holder, the arc becomes intolerably short when initiated and in some cases the electrode even rams the work.

The principal object of this invention is to provide an improved automatic arc welding method in which the above-described adverse effect of the abnormally high arc voltage for a given arc length during heating up of the electrode is overcome, and in which the above-described adverse effect of the inertia of the electrode-moving mechanism may also be overcome, if desired.

Another object of the invention is to provide improved apparatus by which the method may be carried out.

According to the invention a temporary electrical signal is produced and this signal is utilized to counteract the tendency of the abnormally high arc voltage which exists for a given arc length during the heating up to the electrode to produce movement of the electrode toward the work that would make the arc length shorter than the desired normal. If desired, the value of the temporary signal may be such that the tendency of the inertia of the electrode-moving mechanism to make the arc length still shorter is also counteracted. In arc welding systems in which the open-circuit voltage is higher than the arc voltage the temporary electrical signal is preferably produced by the charging of a capacitor under open-circuit conditions after the welding circuit is energized and before the arc is established, the capacitor being connected across one section of a voltage divider which in turn is connected in parallel with the arc. As soon as the arc is established the voltage drop across the section of the voltage divider in parallel with which the capacitor is connected is greatly reduced, and the capacitor discharges through an R-C circuit. The initial voltage of the charged capacitor, and its waning voltage during discharge, are utilized as hereinafter described in the control circuit of the motor mechanism that moves the electrode in response to arc voltage so that the tendency of such motor mechanism to move the electrode too close to the work and make the arc length shorter than the desired normal during the heating up of the electrode when the arc voltage is abnormally high for the given arc length is counteracted.

An A. C. automatic arc welding system embodying apparatus features of the invention and by which my improved automatic arc welding method may be performed is diagrammatically illustrated in the single figure of the accompanying drawing.

Referring to the drawing, there is schematically shown at 10 an electrode holder of the kind usually employed in gas shielded arc welding with a non-consumable electrode such as a tungsten electrode. The electrode is mounted within the electrode holder so that its tip projects a short distance beyond the lower end of the electrode holder as shown at 11. An inert gas, such as argon or helium, is supplied to the electrode holder through a conduit 12 and is discharged by the electrode holder around the tip of the electrode to form a gas shield for the arc, the tip of the electrode, and the weld puddle, as is well understood in the art. A work-piece to be welded is represented at W.

The electrode holder is provided with a rack 13 which is engaged by a pinion 14 on the end of a shaft 15. It is obvious that by turning the shaft 15 in one direction or the other the electrode holder 10 may be raised or lowered to vary the spacing between the tip of the electrode and the work-piece.

Any suitable motor-driven mechanism may be employed for turning the shaft 15 to move the electrode holder up or down, the particular mechanism shown in the drawing for this purpose being similar to that disclosed in the above-mentioned patent to N. E. Anderson No. 2,461,798. It is sufficient for an understanding of the present invention to note that this mechanism includes two electric motors shown at 16 and 17. The motor 17 is a constant speed motor energized from an independent voltage source which is normally constant but which is adjustable. Such a voltage source is diagrammatically represented by the block 18. The other motor 16 is a variable speed motor which is controlled in the manner hereinafter described by the arc voltage. The two motors rotate in opposite directions and are connected to a differential 19 having an output shaft 20. The speed and direction of rotation of the output shaft 20 represents the difference in speed of the constant speed motor 17 and the arc voltage motor 16. If the welding arc is too long, the correspondingly high arc voltage causes the motor 16 to run faster than the motor 17, thus producing a net rotation of the shaft 20 which is utilized to move the electrode holder 10 toward the work to establish the optimum arc length. Similarly, if the welding arc is too short the arc voltage is such that the motor 16 runs slower than the motor 17 to produce rotation of the shaft 20 in the opposite direction to increase the length of the arc to the optimum value.

A pinion 21 is secured to the shaft 20 and engages a spur gear 22 which is one input to a second differential 23. A solenoid 24 has its armature attached to an arm 25 which is connected to one of the bevel gears 26 of the differential 23. This constitutes the second input to this differential. Output of the differential 23 is through the shaft 15 previously referred to the rotation of which raises or lowers the electrode holder 10. A quick-acting relay 27 is connected across the welding machine 28 (the source of welding current) and in parallel with the arc. When the welding current is turned on, the relay 27 is energized by the open-circuit voltage (since the arc has not yet been established) and the armature 27a of the relay is therefore attracted thus breaking the circuit of the solenoid 24 at the relay contact 29. Thus, after the welding current is turned on and during the advance of the electrode holder toward the work the solenoid 24 is de-energized. However, at the instant the electrode touches the work, the welding machine 28 is short circuited and the armature 27a of the relay 27 drops out thus closing the circuit of the solenoid 24 which acts through the arm 25 to turn the shaft 15 and quickly withdraw the electrode holder 10 away from the workpiece to establish the welding arc. Thereafter the motors 16 and 17 maintain the arc length substantially constant.

As above stated, the speed of the electric motor 16 depends upon the arc voltage which is substantially proportionate to the arc length. The welding system illustrated in the drawing is an A. C. welding system and it has been found that in such a system best results are obtained if the signal which controls the speed of motor 16 in accordance with arc voltage is developed from the electrode negative half of the arc voltage cycle. An A. C. automatic arc welding system operating on this principle is disclosed and claimed in my copending application Serial No. 166,656, filed June 7, 1950. It includes a diode vacuum tube rectifier 30 and a load-resistor 31 connected in series with each other and both connected across the arc. The rectified half wave voltage developed across the load-resistor 31 is filtered by the network consisting of a resistor 32 and a capacitor 33. The filtered voltage produced across the resistor 31 and appearing between conductors 34 and 35 provides an electric signal commensurate with the mean value of the electrode negative half cycles of the arc voltage. In the arc welding system disclosed in the above-mentioned copending application this signal is amplified by an amplifier and is used to control the speed of rotation of the variable speed motor 16. In the arc welding system disclosed in the accompanying drawing the filtered half wave voltage appearing between conductors 34 and 35 is utilized as a bias on the control grid 36 of a vacuum tube 37. The tube 37 is connected in parallel with a second vacuum tube 38 in such a manner that the two tubes have a common cathode resistor 39. Assuming a constant potential on the control grid 40 of the tube 38, as the grid of the tube 37 becomes more positive more current flows through this tube and less flows through the tube 38. This makes the potential at point 41 more negative and makes the potential at point 42 more positive. Conversely as the control grid of the tube 37 becomes more negative less current flows through this tube and more flows through the tube 38 causing the potential at point 41 to become more positive and that at point 42 to become more negative. The points 41 and 42 are connected to an amplifier 43 by means of conductors 44 and 45, respectively. The potential difference between the points 41 and 42 is amplified by the amplifier and ultimately controls the speed of motor 16.

The automatic arc welding system thus far described is a satisfactory one for controlling the position of the electrode and hence the arc length in accordance with arc voltage except for the fact that while the electrode is heating up after the arc is established the arc voltage for a given length arc is abnormally high and causes the electrode-moving mechanism to move the electrode holder too close to the work and make the arc length shorter than the desired normal, as above stated. Also as above pointed out the inertia of the moving parts when the electrode holder is being moved toward the work-piece to establish the arc causes the electrode holder to move closer to the work-piece than intended thereby shortening the arc even more after it is established until the condition can be corrected by the electrode-moving mechanism which adjusts the position of the electrode holder in accordance with the arc voltage.

To prevent the electrode-moving mechanism from being affected by the abnormally high arc voltage due to the cold electrode, I connect across the welding circuit a voltage divider consisting of two resistance sections 46 and 47. A rectifier circuit is connected across the resistance section 46 of the voltage divider. This circuit includes a rectifier 48, which is preferably a diode rectifying vacuum tube, and also includes a capacitor 49 connected in series with the rectifier tube. A resistor 50 and a D. C. bias source 51 are connected across the capacitor 49 as shown. The side of the capacitor which is electrically connected to the rectifier tube 48 is also connected by means of a conductor 52 to the control grid 40 of the vacuum tube 38.

When the welding circuit is energized and on open-circuit before the arc is established the full open-circuit voltage of the welding machine 28 appears across the voltage divider 46—47. The capacitor 49 is charged through the rectifier tube 48 to the peak value of the portion of the open-circuit voltage which appears across the section 46 of the voltage divider. This relatively high voltage is also impressed upon the control grid 40 of the vacuum tube 38. When the electrode is moved into contact with the work-piece and the arc is established, the voltage across the section 46 of the voltage divider is greatly reduced. The capacitor 49 then tends to discharge but it cannot do so through the arc or through section 46 of the voltage divider because of the rectifying action of the vacuum tube 48. Its only discharge path is through resistor 50. This resistor and the capacitor 49 are selected with suitable values to produce the desired time constant for this R-C circuit. As soon as the arc is established the capacitor will discharge through the resistor 50 in accordance with some preselected exponential curve. Since the voltage impressed on the grid 40 of vacuum tube 38 is the voltage of the capacitor 49, it will be seen that as the capacitor 49 discharges, the voltage impressed on the grid of the tube 38 will also drop in accordance with the preselected exponential curve. Thus, the instant the arc is established the voltage impressed on the grid 40 of the vacuum tube 38 will be relatively high because the capacitor 49 is then fully charged by the relatively high open-circuit voltage across section 46 of the voltage divider, and therefore the tube 38 will tend to draw a relatively heavy current, but this current will decrease in an exponential manner from the time the arc is established until the capacitor 49 is discharged to the level permitted by the bias source 51. The effect of this is to make the potential at point 42 more negative during the time the capacitor 49 is discharging than it would be in the absence of the capacitor and to make the potential at point 41 more positive during the discharge of the capacitor than it would be in the absence of the capacitor. This is the exact opposite of the effect on the control circuit of the abnormally high arc voltage due to the cold electrode because, as previously made clear, this effect is to cause more current to pass through the tube 37 than through the tube 38 and to cause a change at the point 41 to a more negative potential and a change at the point 42 to a more positive potential.

Thus, it will be seen that I have provided a compensating circuit by which a temporary electrical signal is produced and utilized to counteract the adverse effect of the abnormally high arc voltage due to the cold electrode. The exponential voltage change in the compensating circuit as the capacitor 49 discharges matches approximately the rate of change of the arc voltage for a given arc length as the electrode heats up. The circuit constants may, of course, be selected to suit any particular situation. The circuit constants may be so selected that the bias on the grid 40 of vacuum tube 38 produced by the capacitor 49 will not only counteract the adverse effect of the abnormally high arc voltage due to the cold electrode but will also produce an overcompensating action which will reduce or counteract the above-described inertia effect of the electrode-moving mechanism which produces an arc-shortening effect immediately after the arc is established which supplements the arc-shortening effect of the cold electrode.

The purpose of the D. C. bias source 51 in the R-C circuit 50—49 is to prevent the capacitor 49 from recharging once it has discharged after the establishment of the arc and during the remainder of the welding operation. If the R-C circuit 50—49 is not made inoperative during the periods of normal operation, it would slow the response of the automatic arc length control mechanism. Therefore, the bias provided by the D. C. source 51 is selected to exceed the peak voltage developed across resistance section 46 on arc voltage. This automatically prevents the R-C circuit from functioning during periods of arc maintenance and automatically inserts the R-C circuit in the system whenever there is open-circuit voltage at the gap between the electrode and the work-piece. The D. C. bias source 51 is schematically represented as a battery, but in practice the necessary voltage to produce the D. C. bias would preferably be taken from a power supply circuit.

Representative values of the circuit constants for the compensating circuit are as follows:

Open circuit voltage=100 volts.
Normal arc voltage=20 volts.
Voltage across resistance section 46 on open circuit=25 volts.
Voltage across resistance section 46 during welding=5 volts.
Tube 48=6H6 (1 side).
Capacitor 49=1 mfd.
Resistor 50=1 megohm.
Time constant of R-C circuit=1 sec.
D.-C. bias 51=20 volts.

Any other mechanism for adjusting the position of the electrode in response to arc voltage may be substituted for the one above described without departing from the invention. For example, a full wave rectifier may be used, and the comparator circuit including the tubes 37 and 38 may be replaced by any equivalent mechanism.

While the invention has been described in its application to A. C. arc welding it is applicable also to D. C. arc welding. In fact, the circuit arrangement shown in the drawing can be used for D. C. welding as well as A. C. welding.

The invention is also applicable to an automatic arc welding system in which a consumable electrode is employed. In such a system the mechanism for adjusting the position of the electrode would function to feed the electrode continuously toward the work and would feed it at a faster rate to make the arc shorter when the arc voltage becomes too high and to feed the electrode at a slower rate to make the arc longer when the arc voltage becomes too low. The invention is especially useful, however, in connection with gas-shielded arc welding with a non-consumable electrode, such as a tungsten electrode, this being the kind of arc welding system illustrated in the drawing.

I claim:

1. Automatic arc welding apparatus comprising a welding electrode, a welding circuit including the electrode and the work for supplying current to maintain the welding arc, electrode-moving means for automatically adjusting the spacing between the tip of the electrode and the work, said electrode-moving means being responsive to variations in the arc voltage during the welding operation to maintain the arc length substantially constant and the arc voltage at a corresponding normal value, a voltage divider connected in parallel to the arc, a capacitor connected across one section of the voltage divider which is charged when the welding circuit is energized and before the arc is established, and means responsive to the capacitor charge and to the discharging of the capacitor after the arc is established for counteracting the effect on said electrode-moving means of the increment of arc voltage above said normal value which exists during the interval that the electrode is heating up.

2. Alternating current automatic arc welding apparatus comprising a welding electrode, a welding circuit including the electrode and the work for supplying alternating welding current to maintain the welding arc, electrode-moving means for automatically adjusting the spacing between the tip of the electrode and the work, said electrode-moving means being responsive to variations in the arc voltage during the welding operation to maintain the arc length substantially constant and the arc voltage at a corresponding normal value, a voltage divider connected in parallel to the arc, a capacitor connected across one section of the voltage divider which is charged when the welding circuit is energized and before the arc is established, a rectifier connected in series with the capacitor, a resistance connected in parallel with the capacitor and in a circuit which excludes the rectifier, and means responsive to the capacitor charge and to the discharging of the capacitor through said resistance after the arc is established for counteracting the effect on said electrode-moving means of the increment of arc voltage above said normal value which exists during the interval that the electrode is heating up.

3. Alternating current automatic arc welding apparatus in accordance with claim 2 having a D. C. bias source which biases said capacitor and prevents it from recharging after it discharges and during the remainder of the welding operation.

4. Automatic arc welding apparatus comprising a welding electrode, a welding circuit including the electrode and the work for supplying current to maintain the welding arc, electrode-moving means for automatically adjusting the spacing between the tip of the electrode and the work, said electrode-moving means being responsive to variations in the arc voltage during the welding operation to maintain the arc length substantially constant and the arc voltage at a corresponding normal value, the electrode-moving means including an electric motor and a control circuit therefor, said control circuit including a vacuum tube having a grid which is biased by the arc voltage, a second vacuum tube connected to said control circuit and also having a grid, a capacitor connected in parallel with the arc and electrically connected at one side to the grid of said second vacuum tube, the capacitor being charged when the welding circuit is energized and before the arc is established, and a resistor connected across the capacitor and through which the capacitor discharges after the arc is established, said second vacuum tube being connected to said control circuit such that the bias on its grid by the charged capacitor and during the discharging of the capacitor counteracts that portion of the bias on the grid of said first vacuum tube produced by the increment of arc voltage above said normal value which exists during the interval that the electrode is heating up.

5. Automatic arc welding apparatus comprising a welding electrode, a welding circuit including the electrode and the work for supplying current to maintain the welding arc, electrode moving means for automatically adjusting the spacing between the tip of the electrode and the work, said electrode-moving means being responsive to variations in the arc voltage during the welding operation to maintain the arc length substantially constant and the arc voltage at a corresponding normal value, means providing an auxiliary signal voltage which has a maximum value when the arc is initiated and which decays on an exponential curve having a predetermined time constant, and means responsive to said auxiliary signal voltage counteracting the effect on said electrode-moving means of the increment of arc voltage above said normal value which exists during the interval that the electrode is heating up.

6. In an automatic arc welding method in which an electrode moving means is employed to move automatically the electrode to maintain the arc length substantially at a desired normal, in which the arc voltage is impressed on the electrode moving means to control the operation thereof, and in which the arc voltage for a given arc length is abnormally high during the interval that the electrode is heating up after the arc is first established, the improvement which comprises producing a temporary signal voltage, and applying said temporary signal voltage to the electrode moving means in opposition to the abnormal arc voltage to counteract the tendency of the abnormal arc voltage to produce movement of the electrode toward the work that would make the arc length shorter than said desired normal.

7. In an automatic arc welding method in which an electrode moving means is employed to move automatically the electrode to maintain the arc length substantially at a desired normal, in which the arc voltage is impressed on the electrode moving means to control the operation thereof, and in which the arc voltage for a given arc length is abnormally high during the interval that the electrode is heating up after the arc is first established and would normally cause the electrode to be moved too close to the work during said interval, the improvement which comprises producing a temporary signal voltage, and applying said temporary signal voltage to the electrode moving means in opposition to the abnormal arc voltage to counteract the tendency of the abnormal arc voltage to produce movement of the electrode toward the work that would make the arc length shorter than said desired normal.

8. In an automatic arc welding method in which an electrode moving means is employed to move automatically the electrode to maintain the arc length substantially at a desired normal, in which the arc voltage is impressed on the electrode moving means to control the operation thereof, and in which the arc voltage for a given arc length is abnormally high during the interval that the electrode is heating up after the arc is first established but diminishes from its abnormally high value to a normal value during the time that the electrode is attaining its maximum temperature, the improvement which comprises producing a temporary signal voltage which varies at a rate corresponding substantially to the rate of change of the arc voltage from said abnormally high voltage to its normal value, and applying the signal voltage to the electrode moving means in opposition to the abnormal arc voltage to counteract the tendency of the abnormal arc voltage to produce movement of the electrode toward the work that would make the arc length shorter than the desired normal.

9. In an automatic arc welding method in which an electrode moving means is employed to move automatically the electrode to maintain the arc length substantially at a desired normal, in which the arc voltage is impressed on the electrode moving means to control the operation thereof and in which the arc voltage at a given arc length is abnormally high during the interval that the electrode is heating up after the arc is established but diminishes from its abnormally high value to a normal value during the time that the electrode is attaining its maximum temperature, the improvement which comprises producing a temporary signal voltage which diminishes at a rate corresponding substantially to the rate of diminution of the arc voltage from said abnormally high value to its normal value, and applying said temporary signal voltage to the electrode moving means in opposition to the abnormal arc voltage to counteract the tendency of the abnormal arc voltage to produce movement of the electrode toward the work that would make the arc length shorter than said desired normal.

RICHARD B. STEELE.

References Cited in the file of this patent

UNITED STATES PATENTS

| Number | Name | Date |
|---|---|---|
| 2,175,017 | Cockrell | Oct. 3, 1939 |
| 2,282,522 | Kratz | May 12, 1942 |
| 2,454,191 | MacDonald | Nov. 16, 1948 |
| 2,458,503 | Carpenter et al. | Jan. 11, 1949 |
| 2,460,990 | Kratz et al. | Feb. 8, 1949 |
| 2,461,798 | Anderson | Feb. 15, 1949 |
| 2,468,570 | Nyburg | Apr. 26, 1949 |